Patented Dec. 28, 1926.

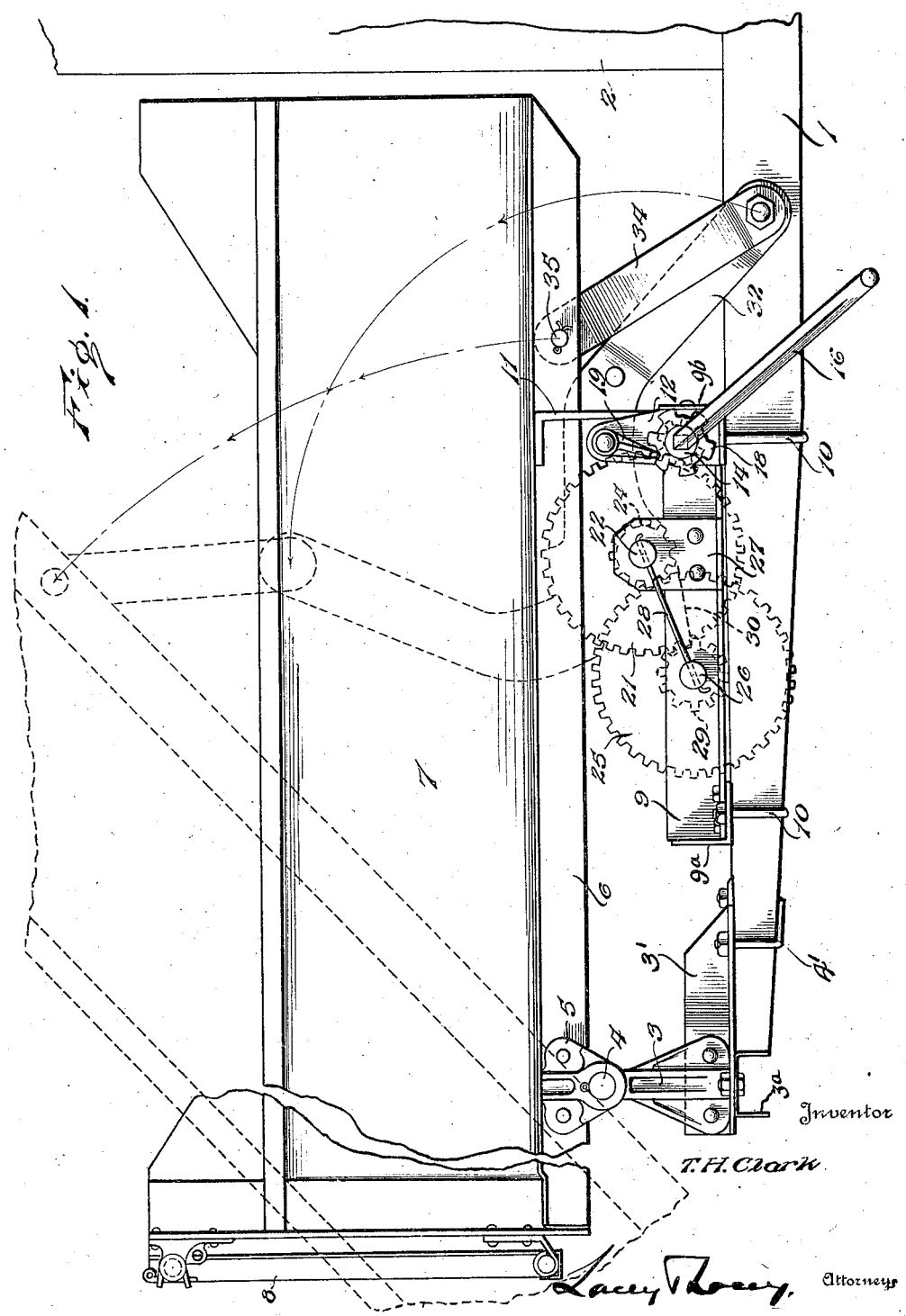

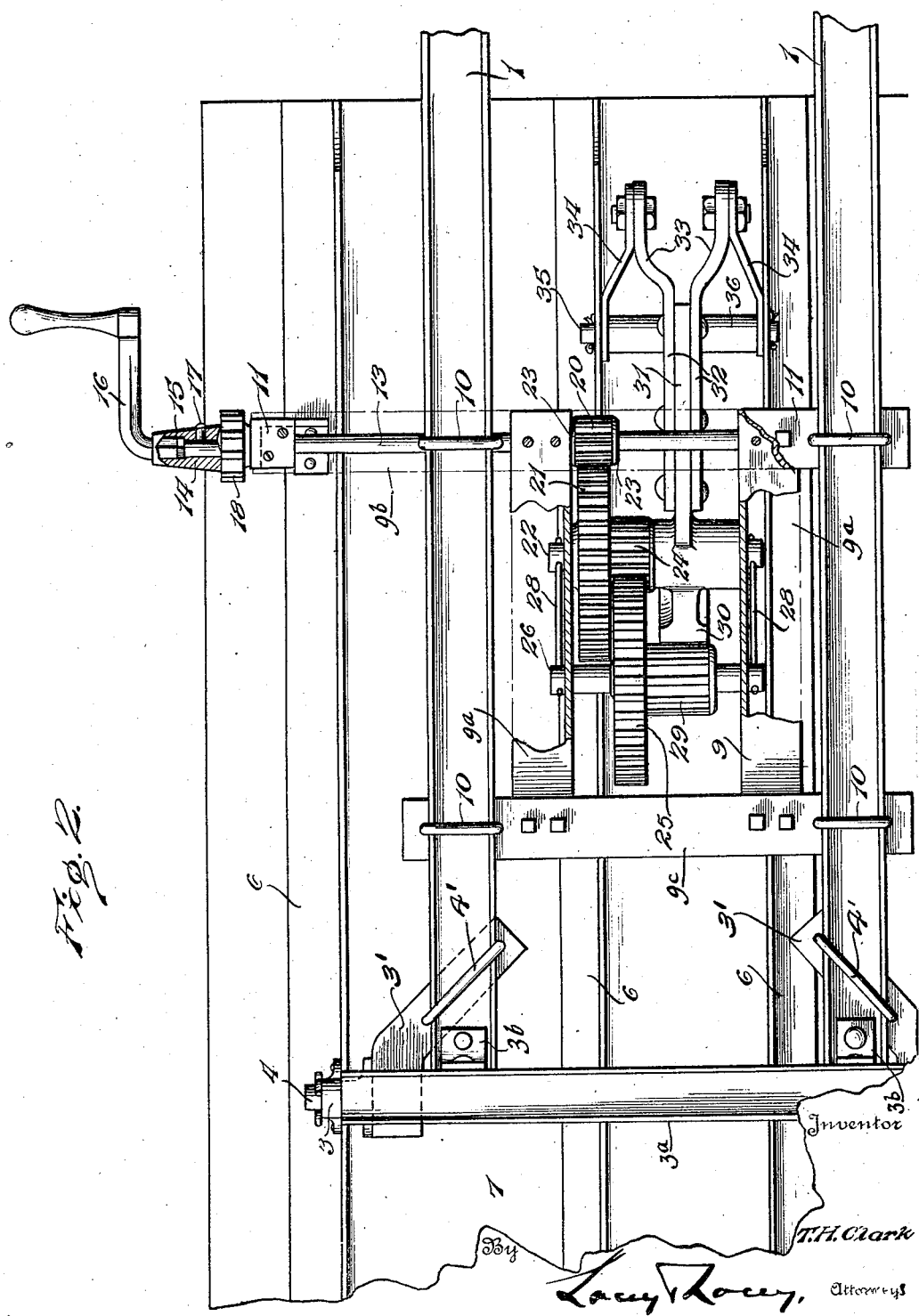

1,612,489

UNITED STATES PATENT OFFICE.

THOMAS H. CLARK, OF MARION, OHIO.

DUMPING TRUCK.

Application filed August 22, 1923. Serial No. 658,784.

This invention relates to dumping vehicles and has special reference to the means for raising and lowering the load-containing body. One object of the invention is to provide a compact and simple mechanism which may be easily operated by hand and effect the raising of the body to dumping position with a minimum effort. Another object of the invention is to so arrange the raising and lowering mechanism that it will be protected from breakage or other damage without necessitating any diminution of the capacity of the body or adding any appreciable dead weight to the vehicle. These stated objects and other objects which will incidentally appear are attained in the use of such an apparatus as is illustrated in the accompanying drawings, and the invention resides in certain novel features which will be hereinafter particularly pointed out.

In the drawings:

Figure 1 is a side elevation of so much of a truck as is necessary to illustrate my invention, the body being illustrated in its lowered load-carrying position in full lines and raised to dumping position in dotted lines, and Fig. 2 is a bottom plan view.

The chassis 1 may be of any convenient construction and its side and end members or bars are preferably formed from channel metal, as shown, the cab, a portion of which is shown at 2, being carried upon the front end of the chassis in the usual manner. At the rear end of the chassis, I secure posts 3 which may be rigidly held in place in any convenient manner but are preferably fixed to arms 3' which project laterally at the outer sides of the side bars of the chassis and are rigidly secured to said bars by U-bolts 4'. At the upper ends of the said posts are trunnions or pivot members 4 which are engaged by brackets 5 secured to the sills 6 of the body 7 adjacent the rear ends of said sills, as will be readily understood. The sills are provided in any desired number and are preferably angle bars so as to possess the requisite strength without excessive weight. The body 7 is equipped at its rear end with an end gate 8 which may be of any well-known or preferred form and may be mounted to open automatically as the body is tilted to dumping position or may be otherwise mounted as preferred.

Inasmuch as the particular construction and mounting of the end gate is not an essential part of my present invention, I have illustrated the same in a more or less conventional manner only.

In carrying out my invention, I secure upon the chassis a frame, indicated at 9, which is constructed of channel bars and angle bars disposed longitudinally and transversely of the chassis and rigidly connected by bolts or rivets. This frame may be of any suitable form and may be conveniently secured upon the chassis by U-bolts or cleats 10 engaged through the frame members and passing around and under the bars of the chassis, as shown and as will be readily understood. At the front end of the frame 9, I provide brackets or stops 11 which are rigidly secured upon the frame in any convenient manner and rise therefrom to form supports for the front end of the body when the same is lowered.

Bearing brackets 12 are provided at the front end of the frame 9 and the operating shaft 13 is rotatably mounted in these brackets and extends transversely of the vehicle, as shown and as will be readily understood. One end of the said shaft 13 is fitted in the hub of a drum or ratchet member 14, the outer end of which is constructed with an angular socket 15 to receive the correspondingly shaped end of a crank handle 16 which is removably engaged in the socket when the body is to be tilted so that rotation of the crank will effect rotation of the member 14 and the shaft 13, the said drum and ratchet member 14 being secured to the end of the shaft by a rivet, as indicated at 17.

On the inner end of the member 14 is formed a ratchet or annular locking member 18, and pivotally mounted upon or adjacent the bearing brackets 12 above the said locking member is a pawl or dog 19. The pawl or dog is so mounted that it may be readily swung to dispose its free end either in rear or in advance of the vertical plane of its pivot so that it may engage the radial lugs of the ratchet or locking member 18 at either side and thereby hold the body in either its dumping or its carrying position. Between the sides of the frame 9, a pinion 20 is secured upon the shaft 13, and this pinion meshes with a gear 21 which is rotatably mounted upon a transverse rod or stationary shaft 22. The pinion 20 is provided at its ends with shrouds or stop flanges 23 whereby its alinement with the gear 21 is maintained and the gear 21 is integral with or has rigidly secured to its outer side a pinion 24, the said pinion meshing with a gear 25 which is rotatably mounted upon a transverse rod or stationary shaft 26 mounted in the frame 9. The shaft 26 is disposed in rear and somewhat below the shaft or rod 22, as shown most clearly in Fig. 1, the shaft or rod 22 being mounted in brackets 27 forming a part of the frame 9. The shafts or rods 22 and 26 may be held against turning by any desired means, and I have shown pins or locking rods 28 inserted through the adjacent ends of the shafts at the outer sides of the frame, the extremities of the said locking pins being turned laterally whereby endwise movement of the pins will be prevented. This arrangement is very simple and inexpensive and may be very easily and quickly applied, but it is to be understood that other locking means may be employed without involving any departure from the invention. Formed integral with or rigidly secured to one side of the gear 25 is a pinion 29 which meshes with a segmental gear 30 loosely fitted upon the rod 22 at the side of the pinion 24. Projecting from the hub of the gear 30 is a lever arm 31 and to the sides of the said arm 31, I rigidly secure the extensions 32 which project beyond the end of the said arm and have their extremities turned laterally so as to diverge, as shown at 33. To the free ends of the said extension members 32, I pivotally attach links 34 which extend upwardly and diverge and have their upper ends pivotally attached to the adjacent sills 6 by a pivot pin or rod 35 inserted transversely therethrough. A spacing sleeve 36 is fitted about the said pivot rod 35 between the ends of the links 34 so as to maintain the said ends in the properly spaced relation and thereby apply the lifting force in an effectual manner to the body 7.

The construction and arrangement of the several parts of the apparatus having been thus made known, it is thought the operation thereof will be readily understood. With the parts arranged as shown in full lines in Fig. 1, the dog 19 will prevent the rotation of the locking member 18 and the shaft 13 in a forward direction and will, therefore, hold the body down in its load-carrying position so that accidental tilting of the body through hasty, careless or improper loading thereof will be prevented. When it is desired to dump the load, the crank 16 is engaged in the socket 15, after which the dog 19 is swung over around its pivot so that it will engage the locking ratchet member 18 in advance of the vertical plane of the pivot and permit forward rotation of said member but prevent rearward rotation of the same. The crank 16 is then rotated in a clockwise manner so that the shaft 13 will be rotated and, of course, the pinion 20 will follow the rotation of the shaft. The gear 21 and pinion 24 will be thereby caused to rotate about the rod 22 and will impart rotation to the gear 25 which will be transmitted directly to the pinion 29. The rotation of the pinion 29 will then cause the segment 30 to swing downwardly about the rod 22 and the lever arm 31 with the extensions 32 will, of course, move upwardly. The upward movement of the arms 32 will be imparted to the links 34 and transmitted through said links to the body 7 so that the parts will assume the position shown in dotted lines in Fig. 1, the paths of the pivots of the links being indicated by the series of arrows. When an impulse is imparted to the front end of the truck body through the links 34, any tendency of the body to merely slide rearwardly is overcome by the resistance of the pivots 4 and the brackets cooperating therewith so that the front end of the body will be caused to swing upwardly along an arc having the said pivot 4 as its center and the body will be thereby readily and quickly tilted to dumping position so that the load may slide out through the rear end of the body. It will be readily noted that the several elements of the train of gearing are arranged in nested relation so that they are brought into a very compact form and will occupy very little space upon the chassis of the vehicle, and the force transmitted through the several gears will be applied to the body in such a manner that no undue strain is required to raise the body to dumping position even when it is loaded to capacity. When the load has been discharged, the dog or pawl 19 is returned to the position shown in Fig. 1 and the body may then be permitted to return to the load-carrying position through its own weight or may be positively returned through a reverse rotation of the crank and the shaft 13.

It will be readily noted that the only part of my mechanism which is carried beyond the vertical planes of the sides of the vehicle is the outer end of the member 14, all the working parts being disposed between the sides of the chassis and between the chassis and the body so that the chance of any of the parts being broken through accidental blows is negligible.

It will also be noted that all of the operating mechanism is mounted upon the frame 9 which is secured upon the chassis. The body-operating elements may, therefore, be assembled upon the frame 9 and the assembled elements and the frame secured as a unit upon the chassis, the application of the mechanism to the truck being thereby facilitated.

The unit 9 consists of a main, or forward frame, in contradistinction to the rear, or auxiliary frame forming a dumping bearing bracket and comprising the members 3' and the connecting member 3ª. As set forth, the main and the auxiliary frames are separately and independently secured to the side bars 1 of the chassis frame. As a result, when the truck is loaded and the wheel on one side should strike a ditch, or rut, and throw the chassis atwist it would not affect the sub-frame because of its separate formation. Moreover, replacements and adjustments can be more readily and economically made than would be the case if the sub-frame consisted of a single or unitary structure. The front or main frame 9 consists of longitudinal bars 9ª lying within the side bars 1, a forward transverse bar 9ᵇ and a rear transverse bar 9ᶜ. The transverse bars 9ᵇ and 9ᶜ connect the longitudinal bars 9ª and project beyond the latter and rest upon the chassis frame bars 1 to which they are secured by the fastenings 10. The rear, or auxiliary frame forming the dumping bearing bracket consists of the members 3' and the transverse member 3ª. The bracket members 3' are secured at their inner ends to the side bars 1 and their outer ends project laterally and rearwardly. The inner ends of the members 3' are preferably oppositely inclined. The outer rear ends of the members 3' extend beyond the rear ends of the side bars 1 in parallel relation and the connecting member 3ª underlaps the projecting ends and abuts against the rear ends of the side bars 1 to which it is secured by angle brackets 3ᵇ.

Having thus described the invention, what is claimed as new is:

1. A dumping vehicle comprising parallel side bars, oppositely inclined brackets resting upon and secured to the rear portions of the side bars and extending rearwardly therefrom, a transverse member connecting the rear extensions of the brackets and abutting the ends of the side bars, angle brackets connecting the transverse member and side bars, a dumping body tiltingly mounted upon the said brackets, means mounted upon the said side bars for normally supporting the front portion of the body when in lowered position, longitudinal bars between and spaced inwardly from the side bars, front and rear transverse bars connecting the longitudinal bars and resting upon the side bars and secured thereto, the front bar extending laterally, a shaft mounted upon the said front transverse bar and having a crank handle associated therewith, a ratchet mechanism to prevent backward rotation of the shaft, a train of gearing mounted between the said longitudinal bars and connected with the said shaft and including an arm, and connecting means between the said arm and dumping body to effect a tilting thereof.

2. In a dumping vehicle including parallel side bars, a dumping body tiltingly mounted upon the side bars, parallel longitudinal bars between and spaced inwardly from the side bars, front and rear transverse bars connecting the longitudinal bars and resting upon and secured to the side bars, a transverse shaft mounted on the front transverse bar, shafts removably mounted in the longitudinal bars, a train of gearing having its elements loosely mounted upon the removable shafts and including an arm and forming connecting means between the said arm and the transverse shaft, and connecting means between the arm and the dumping body to effect a tilting thereof.

3. The combination with a truck chassis including a frame having side bars, and a body tiltingly mounted upon the chassis frame and having longitudinal sills upon its bottom, of a sub-frame secured to the chassis frame, a train of gearing carried by the sub-frame and including a forwardly extending arm, extensions secured to opposite sides of the arm and having their outer ends laterally offset, and links secured to the laterally offset ends of the extensions and spread towards the outer ends which are pivoted to the sills of the body.

In testimony whereof I affix my signature.

THOMAS H. CLARK. [L. S.]